United States Patent [19]

Highgate et al.

[11] Patent Number: 4,764,575

[45] Date of Patent: Aug. 16, 1988

[54] HYDROPHILIC MATERIALS

[76] Inventors: Donald J. Highgate, The Wilderness, Holmbury Hill Road, Dorking, Surrey; John D. Frankland, 89 Redhill Wood, New Ash Green, Dartford, Kent, both of England

[21] Appl. No.: 934,703

[22] Filed: Nov. 25, 1986

[30] Foreign Application Priority Data

Nov. 25, 1985 [GB] United Kingdom ............... 8529006

[51] Int. Cl.$^4$ ............................................. C08F 26/08
[52] U.S. Cl. ................................. 526/264; 526/342
[58] Field of Search ........................... 526/264, 342

[56] References Cited

U.S. PATENT DOCUMENTS

| | | | |
|---|---|---|---|
| 3,878,175 | 4/1975 | Steckler | 526/264 |
| 4,184,992 | 1/1980 | Hosaka | 526/62 |
| 4,663,409 | 5/1987 | Friends et al. | 526/242 |
| 4,668,506 | 5/1987 | Bawa | 523/107 |

FOREIGN PATENT DOCUMENTS

| | | | |
|---|---|---|---|
| 38-7472 | 5/1963 | Japan | 526/264 |
| 61-57611 | 3/1986 | Japan | 526/264 |
| 722790 | 1/1955 | United Kingdom | 526/264 |
| 743825 | 1/1956 | United Kingdom | 526/264 |
| 2088390 | 6/1982 | United Kingdom | 526/264 |

*Primary Examiner*—Joseph L. Schofer
*Assistant Examiner*—N. Sarofim
*Attorney, Agent, or Firm*—Parkhurst & Oliff

[57] ABSTRACT

Hydrophilic polymers of the type suitable for use in making contact lenses and having a wide range of controllable properties including strength and gas permeability are formed from acrylonitrile or methyl methacrylate or an analogue thereof, 1-vinyl-2-pyrrolidinone and an appropriate amount of a cross-linking agent. Contact lenses (3) having an interferometric pattern thereon are also disclosed.

1 Claim, 1 Drawing Sheet

HYDROPHILIC MATERIALS

This invention relates to hydrophilic materials which, for the purposes of this specification, are polymer structures capable of taking in water such that the properties of the polymer system are reproducibly and stably modified. During this process, the materials normally swell isotropically without dissolving or otherwise degrading. This invention relates also to the preparation and use of such materials and products comprising them, especially contact lenses.

Typical conventional materials include hydroxyethyl methacrylate (HEMA) and co-polymers of HEMA or methyl methacrylate with vinyl pyrrolidone (or 1-vinyl-2-pyrrolidinone). Such materials absorb water in large quantities, e.g. between 0.5 and 5 times the dry weight of the polymer. The result is that the polymer, initially hard, becomes soft and elastic and exhibits much enhanced water and gas permeabilities. For these reasons the materials have found application in biomedical and optical products where, for example, accurate lenses may be cut and polished from material in the dry state and subsequently hydrated to provide lenses of predictable properties but enhanced comfort and safety because of the increased softness and fluid permeability.

In general, there are three main types of contact lens material now known. These are:

(i) Materials which are hard and remain substantially unaltered in the eye, being unaffected for all practical purposes by hydration or temperature. Glass or methyl methacrylate are examples of such materials from which contact lenses are made.

(ii) Materials which soften on water uptake (hydrophilics).

(iii) Elastomeric material not affected by water, which are soft at all temperatures between 10° and 40° C. (typified by silicone elastomer).

The disadvantages of the conventional systems are principally:

1. The tear strength of the hydrated materials is low, and decreases as the equilibrium moisture content of the polymer is increased. In particular, the ratio of notch tear strength to smooth surface tensile strength is low ($<0.1$). This results in products of reduced life expectancy; for example, daily wear contact lenses made from conventional hydrophilic materials typically fail by tearing after three to nine months of use.
2. For certain applications, notably extended-wear contact lenses, permanently-installed nerve sheaths, and arterial replacement materials, the oxygen transmission capability of the materials may be insufficient for the biological needs of the surrounding tissue.
3. For certain other applications, notably in simple spherical contact lenses able to correct significant amounts of corneal astigmatism, the material requires a high level of gas and liquid permeability which implies a structure which is too soft and deformable to maintain the required physical shape and mechanical rigidity for good optical results.
4. Normal high moisture content hydrophilic materials are soft and very easily deformed when hydrated (e.g. by the forces of surface tension and eyelid contact in ophthalmic applications). Thus, dimensional stability is limited, with the result that visual acuity may be poor, particularly in the case of simple lenses used to correct corneal astigmatism.

The present invention discloses a number of material systems and methods, each of which may overcome or reduce one or more of the disadvantages listed above.

According to a first aspect of the invention, in order to provide a material of high tensile strength and high tear strength, a cross-linked copolymer is composed of acrylonitrile and 1-vinyl-2-pyrrolidinone in the component ranges (percentages by volume)
Acrylonitrile: 20–80%
Vinly Pyrrolidone: 80–20%
Cross-linking agent: 0–10%

Methacrylonitrile may be used instead of acrylonitrile.

The result is a very strong, elastic material of high tear strength suitable for the production of contact lenses by casting or machining and polishing. The resulting contact lenses may be handled daily for cleaning and insertion in the eye, with an economical life of one to two years, since the tensile strength is up to 17 times that of HEMA while the ratio of tear strength to smooth surface strength is also greatly improved, e.g. up to approximately 0.8. It is known that the gas permeability of such a system can be additionally increased by the chemical incorporation of silanes containing a polymerisable carbon-carbon double bond or similarly active silicone polymers.

According to a second aspect of the invention, in order to provide a material of enhanced gas permeability, a material of high oxygen permeability is dispersed within a matrix composed of any suitable hydrophilic material. Examples of materials suitable for dispersion within the hydrophilic matrix are elastomeric silicone particles and the liquid fluorocarbon materials available as "Flutec" from ISC Chemicals Ltd., Avonmouth, England. This latter material is stable and bio-compatible; indeed, it is used in an artificial blood replacement material, but it is not miscible with water or the monomers commonly used to produce hydrophilic systems.

For example, a conventional hydrated hydrophilic material of water content 60% may have an oxygen permeability in the range $20\text{--}25 \times 10^{-11}$ ml/mm/mm²/mm Hg/sec; if 50% of its bulk volume is occupied by a silicone elastomer or fluorocarbon material of oxygen permeability $90 \times 10^{-11}$ ml/mm/mm²/mm Hg/sec, then the overall permeability of the composite will be in the range $40\text{--}50 \times 10^{-11}$ ml/mm/sec/mm Hg, while the water permeability and tensile properties will continue to be established by the properties of the matrix material. This overall permeability value is high, in the sense that it should provide a contact lens suitable for extended wear.

A method has been developed for the production of the desired product, in which the oxygen-permeable material (Flutec or silicone particles) is in the form of an emulsion or dispersion of microscopic drops or particles within the hydrophilic monomer (or pre-polymer) system, prior to polymerisation of the hydrophilic monomers to form a solid or elastic matrix. The dispersion may be achieved by the use of ultrasonic stimulation using power densities up to 150 watts/cm² and frequencies between 20 kHz and 25 MHz. The precise conditions required depend upon the size of the polymerised mass and the properties of the dispersion to be achieved.

For ophthalmic applications, the oxygen-permeable material must be dispersed as particles whose diameters are small compared with the wavelength of light. If this is achieved, the interaction between an incident light wave and the, say, emulsified fluorocarbon material or suspended silicone elastomer will be restricted to Mie scattering. Provided that the particles of the dispersed phase are smaller than 0.5 μm (5000 Angstrom units) in diameter, the scattering will be restricted to frequencies above $6 \times 10^{15}$ Hz, i.e. in the blue and ultra-violet regions of the spectrum. Thus, the material will appear visually transparent while containing significant volume concentrations of fluorocarbon material in the dispersed phase. Indeed, the colour of the finished material may be controlled by varying the particle size of the dispersed phase and this may itself be a desirable objective since the colouration is produced without the use of dyestuff.

In order to achieve the desired degree of dispersion in the finished product, the dispersion must first be established while the hydrophilic monomers are in the liquid phase and then maintained throughout the polymerisation of the hydrophilic matrix. This may be undertaken either by ultrasonic stimulation of the vessel, mould or tubes in which polymerisation takes place, or in principle by the use of suitable emulsifying agents. However, these must be bio-compatible and the preferred route is to use an ultrasonic transducer, mounted on the mould used for polymerisation, to maintain the dispersion until polymerisation has proceeded sufficiently to produce a gel able to maintain the stability of the emulsion.

For example, the monomer mixture is placed in a glass, metal or polythene tube which is flushed with nitrogen gas and sealed. An ultrasonic generator such as a piezo-electric crystal or a metallic horn connected to a generator is fixed to the bottom of the tube. Dispersion is caused by switching on the ultrasonic system, and tuning the frequency until energy dissipation in the tube is maximised.

Once the dispersion has been produced, polymerisation may be started. The liquid will then tend to solidify, and it is then appropriate to adjust the input frequency, in order to maintain a uniform and transparent emulsion. The maintenance can be conducted automatically. This procedure is continued until the dispersion is stable without ultrasonication.

Materials can be formed using any of the hydrophilic monomer mixtures given above, or hydrophilic systems based upon methyl methacrylate and vinyl pyrrolidone, and styrene and vinyl pyrrolidone. The volume proportions of fluorocarbon liquids or silicone elastomer particles successfully introduced has been from 20 to 60%. The maximum achievable concentration is not yet known.

Examples of systems showing useful properties can be formed using:

(i) Methyl methacrylate/VP matrix + 30% v/v Flutec
(ii) Acrylonitrile/VP matrix + 50% v/v Flutec or silicone elastomer
(iii) Hydroxyethyl methacrylate matrix + 20% v/v Flutec The method of ultrasonic stimulation during polymerisation may also be used to maintain a dispersion of gas bubbles in the monomer mixture during polymerisation, thus forming a porous matrix (as an alternative to controlled "blowing" of the initial mixture). Such a matrix can then be filled with a suitable liquid, gel or monomeric material suitable for subsequent polymerisation; all these methods result in a composite material giving separate control of macroscopic mechanical properties on the one hand and of gas or liquid transmission properties on the other.

According to a third aspect of the present invention, in order to provide a high water content hydrophilic materials of enhanced stiffness, a suitable composition comprises a monomer mixture, e.g. a known monomer mixture, in conjunction with a very high concentration of cross-linking material. An example is:

Methyl methacrylate 10–70%
1-vinyl-2-pyrrolidinone 10–70%
Cross-linking agent 0.01–60%
Initiator 0.01–5% wherein the percentages are by volume of the polymerisation mixture.

In the case where the amount of cross-linking agent rises above 5%, it can be assumed that the cross-linking agent acts as a multi-functional co-monomer.

It is often desirable to include a silane or siloxane, e.g. in the proportion 5–25%. Suitable silanes or siloxanes are Wacker Silanes V's, GF 56, GF 58, GF62, Union Carbide A174, A175, A172, A188 and siloxanes produced from them, wherein the percentages are by volume of the polymerisation mixture.

The advantages of high liquid and gas permeability (which are important for corneal metabolism) are retained, while in addition the materials systems are sufficiently rigid to form a lens which is able to maintain its optical shape within the optical zone. Thus, by suitable design of the edge of the lens, control of lens movement and patient comfort can be achieved.

According to a fourth aspect of the invention, a material system achieves comfort in the eye by softening as the result of temperature increase, by contrast with conventional hydrophilic material which softens and increases the comfort in the eye by the process of absorbing water.

The novel system employs a material which has a high temperature coefficient of its mechanical properties, i.e. it softens rapidly with increasing temperature. Such materials may or may not additionally be hydrophilic. However, if not hydrophilic the objective is to provide a material which is sufficiently rigid to lathe and polish at 10°–20° C. while softening usefully at eye temperatures 37° C.

To be most helpful, the modulus of the material should decrease by a factor of 5 or more. The material preferably has a glass transition temperature of approximately 20° to 25° C.

It has been found that ethoxyethyl methacrylate provides a useful softening effect in a non-hydrophilic material. Other materials which operate as thermo-softening systems are cross-linked co-polymers or multi-component polymers which include n-butyl methacrylate, isobutyl methacrylate and cyclohexyl methacrylate. In addition, styrene and alkyl styrenes can be used with the above co-monomers. Materials which soften thermally and are additionally hydrophilic are produced by the inclusion of hydrophilic monomers such as 1-vinyl-2-pyrrolidinone, acrylamide or dimethylaminoethyl methacrylate into the above monomer mixes.

All polymers, co-polymers and pre-polymers mentioned above can be produced using conventional chemical initiators or ionising radiation of combinations of both.

For example, using an initiator such as AIBN, a monomer mixture may be placed in a tube, e.g. of polyethylene, and placed in a water bath where it is subjected to gradual increases of temperature over a predetermined period.

As an alternative to the full thermal cycle it is possible to polymerise the material by exposure to high frequency electro-magnetic or ionising radiation; for example, Gamma radiation from a CD60 source when a dose of 0.1 to 2.5 Mrad will cause polymerisation.

In general herein, where acrylonitrile or methyl methacrylate has been indicated, an alternative compound of similar structure and function may sometimes be used instead, e.g. a compound of the formula

$$CH_2 = CR - X \qquad (I)$$

wherein R is H or $CH_3$ and X is CN, phenyl, COOH or $COOR^1$ in which $R^1$ is $NH_2$ or $C_{1-6}$ alkyl (e.g. methyl, ethyl or cyclohexyl) optionally substituted by a functional group selected from CN, OH, $C_{1-6}$ alkoxy (e.g. ethoxy), $NH_2$, $C_{1-6}$ alkylamino (e.g. methylamino) and di($C_{1-6}$ alkyl)amino (e.g. dimethylamino). Where two or more $C_{1-6}$ alkyl groups are present, they may be the same or different; each is preferably $C_{1-4}$ alkyl, e.g. methyl or ethyl. One preference is that X is CN or $COOR^1$ in which $R^1$ includes a functional group, (e.g. $R_1$ = dimethylaminomethyl or 2-hydroxyethyl); another preference is that X is $COOR^1$ in which $R^1$ is unsubstituted.

Again, in general, another N-vinyllactam may be used instead of 1-vinyl-2-pyrrolidinone.

Instead of any of the given monomers, a non-cross-linked partially-polymerised form may be used.

The relative I:vinyllactam amouns (by volume is the compositions described herein) are preferably 70:30–30:70, more preferably 60:40–40:60, but variation may produce desirable properties.

The following Examples illustrate the invention. All percentages and proportions are by volume unless otherwise specified. The following abbreviations are used:
VP = 1-vinyl-2-pyrrolidone
AN = acrylonitrile
AMA = allyl methacrylate
MMA = methyl methacrylate

EXAMPLE 1

Equal volumes of VP and freshly-distilled AN are mixed. 1.0% AMA and 0.1% AIBN are added. The resultant mixture is placed in a polythene tube and placed in a water bath, where it is subjected to a thermal cycle comprising the following: 24 hours at 35° C., 40° C., 45° C. and 50° C., 36 hours at 60° C., 4 hours at 75° C. and 4 hours at 95° C.

The copolymer thus prepared is transparent, highly elastic when hydrated and has a water content of 40%.

EXAMPLE 2

The procedure of Example 1 is repeated but the amounts of the constituents are changed: 30% AN and 70% VP are mixed. 0.1% AMA and 1.0% AIBN are added. The product is a hydrophilic system having a higher water content than that of Example 1.

EXAMPLE 3

20 g Trogamid T (produced by Dynamit Nobel; trade name for an aromatic nylon polymer) are dissolved in 60 g VP. The resulting viscous liquid is placed in polythene tubes together with 0.1% AIBN and subjected to a thermal polymerisation cycle, as described in Example 1.

Satisfactory contact lenses may be formed from the products of each of Examples 1, 2 and 3.

EXAMPLE 4

The procedure of Example 1, 2 or 3 is repeated but, instead of the thermal cycle, polymerisation is induced by exposure to gamma radiation from a C600 source, at a dose of 1–2 Mrad.

EXAMPLE 5

Equal volumes of AN and VP are mixed, and AMA and AIBN are then added (as in Example 1). Flutec PP5 is then added to give a composition comprising 25:25:50 AN:VP:Flutec. The resultant mixture is placed in a glass tube (100 mm long; 20 mm diameter) which has been flushed with nitrogen, and sealed.

A piezo-electric crystal is attached to the bottom end of the tube. The tube is placed in a temperaturecontrolled oven. An ultrasonic system is switched on; the frequency is tuned to about 30 kHz, whereby the energy dissipation into the liquid mixture is maximised and a uniform transparent dispersion of the fluorocarbon is formed.

A controlled heating cycle of the type illustrated in Example 1 is applied, at 40–60 and 80° C. In consequence, the liquid begins to gell, and the ultrasonic power input is increased in order to maintain a uniform and transparent emulsion. The input frequency can be adjusted automatically in response to the desired property.

The resulting material contains 50% entrapped fluorocarbon. It is hydrophilic, having a linear expansion ratio of 1.3 and a water uptake of approximately 50%.

EXAMPLE 6

The procedure of Example 5 is repeated but, instead of the heating cycle, polymerisation is initiated by irradiation. Heat of reaction is removed, in order to avoid the formation of bubbles. The polymerisation time is reduced.

EXAMPLES 7 TO 14

In a manner parallel to that of Example 1, freshly-distilled MMA, VP, AMA and AIBN are formulated (as tabulated below) and subjected to a heating cycle.

| Example | MMA (%) | VP (%) | AMA (%) | AIBN (% added) |
|---------|---------|--------|---------|----------------|
| 7 | 40 | 55 | 5 | 0.1 |
| 8 | 35 | 50 | 15 | 0.1 |
| 9 | 25 | 60 | 15 | 0.1 |
| 10 | 20 | 60 | 20 | 0.1 |
| 11 | 10 | 70 | 20 | 0.1 |
| 12 | 10 | 60 | 30 | 0.1 |
| 13 | 10 | 50 | 40 | 0.1 |
| 14 | 10 | 40 | 50 | 0.1 |

The products have good liquid and gas permeabilities. Satisfactory contact lenses may be formed therefrom.

EXAMPLE 15

37.5% MMA, 50% VP and 12.5% ethoxyethyl methacrylate are mixed. 15% of Wacker Silane V are added. The mixture is polymerised by the procedure of Example 1.

According to a fifth aspect of the invention, a lens, and thus its power, are modified by the use of printed interferometric patterns.

A conventional contact lens uses the differences in the shapes of the front and rear surfaces to provide the required lens power. For example, spherical surfaces give simple plus or minus powers. This process is well understood and the surfaces are normally simple spherical shapes; however, other optical corrections, e.g. for astigmatism, spherical aberrations or the production of bi-focal lenses, require that one surface or the other be cut with aspheric surfaces of complex form which are difficult and costly to produce and render the lens difficult to fit.

It is further known that suitable printed patterns can exhibit optical effects such as focusing to a line or a point; such patterns are known as "Zone Plates" and are fully described in the literature, e.g. on page 264 of Geometrical and Physical Optics by R. S. Longhurst (1957), pub. Longmans; FIG. 13-4 therein shows a typical zone plate design.

It has now been found that, if such patterns are printed onto a simple spherical contact lens, the power of the lens can be modified without the need to cut complex aspheric lenses. Thus, for example, a simple spherical lens may be modified by printing to provide a limited region of additional positive power to form a bi-focal without any change in the surface shape.

In principle, other modifications could be achieved, for example correction for spherical effects in very high power lenses and cylindrical effects for the correction of astigmatism by the use of parallel Fresnel diffraction patterns.

The process of printing on hydrophilic surfaces is well understood, and involves a simple screen or jet printing technique, e.g. using a suitable PVC-based ink. A simple lens may be overprinted (or etched) with a zone plate (or phase reversal zone plate) to produce a region of modified power equivalent to a bifocal. The cost of such a process is substantially less than that for producing a conventional bifocal.

This aspect of the invention, and its relation to the prior art, will now be illustrated, by way of example only, with reference to the accompanying drawings, in which.

Figure 1:
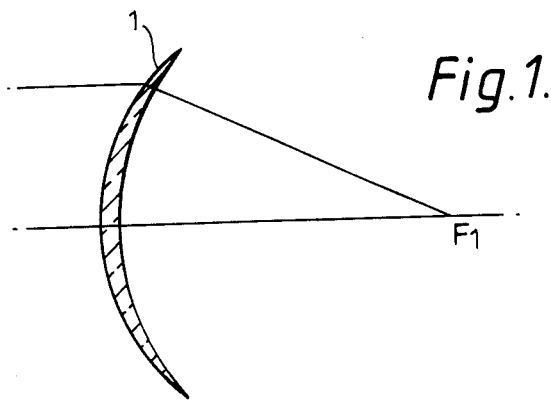
FIG. 1 is a section through a conventional monofocal lens.
Figure 2:
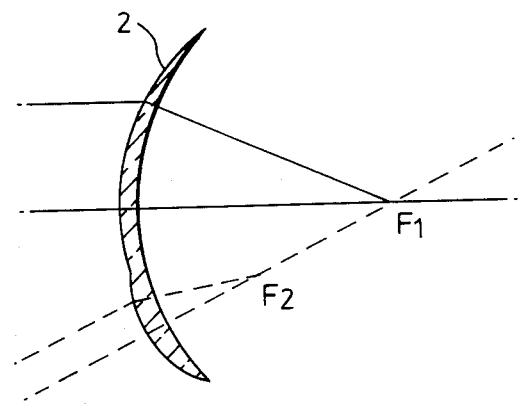
FIG. 2 is a section through a conventional bifocal lens.
Figure 3:
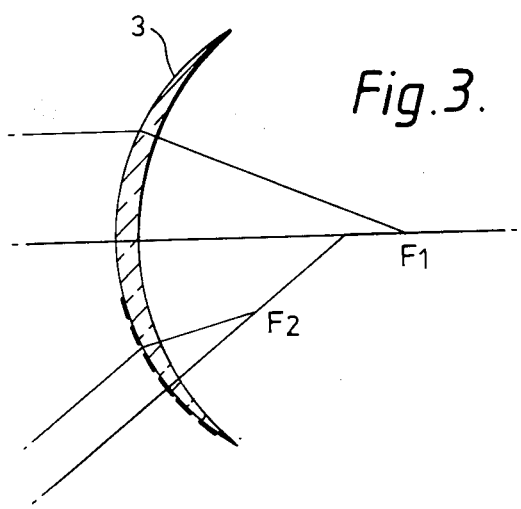
FIG. 3 is a section through a lens embodying the invention.
Figure 4:
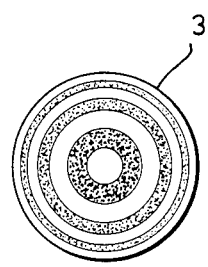
FIG. 4 is a plan view of the lens shown in FIG. 3.

FIG. 1 shows a lens 1 through which light passes and is focussed at $F_1$. FIG. 2 shows a bifocal lens 2 through which light passes and is focussed at $F_1$ or $F_2$. FIGS. 3 and 4 show a lens 3 having a zone plate pattern, through which light passes to give the same effect as is shown in FIG. 2. Lens 3 has a simple shape; by contrast, lens 2 has a complex surface shape, necessary to provide a second focus for reading.

What we claim is:

1. A cross-linked copolymer derived from monomers which comprise a mixture consisting of 40 to 60% by volume acrylonitrile or methacrylonitrile and 60 to 40% by volume 1-vinyl-2-pyrrolidinone, and up to 10% by volume, based on the volume of said mixture, of a cross-linking agent.

* * * * *